(No Model.) 2 Sheets—Sheet 1.
G. W. ZEIGLER.
TENT FRAME.
No. 407,427. Patented July 23, 1889.
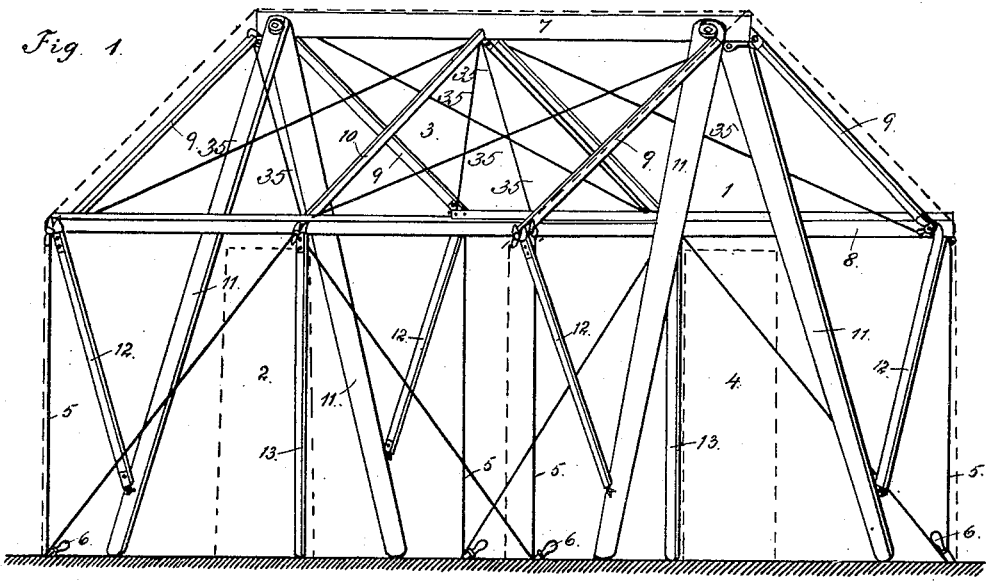
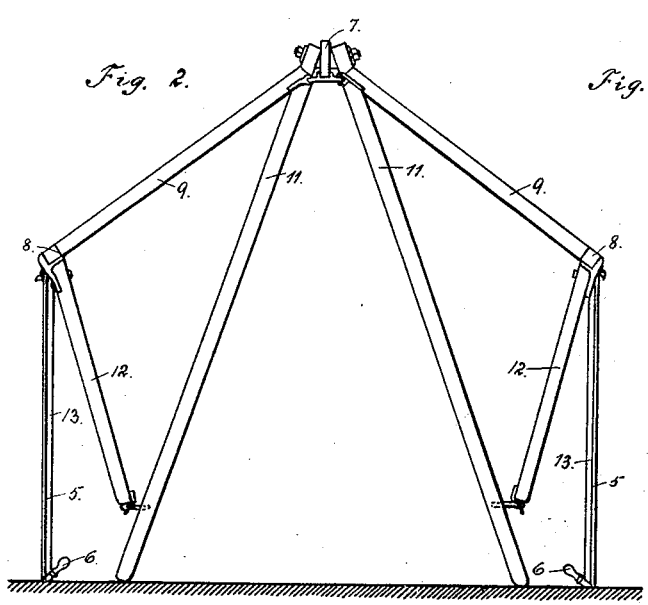
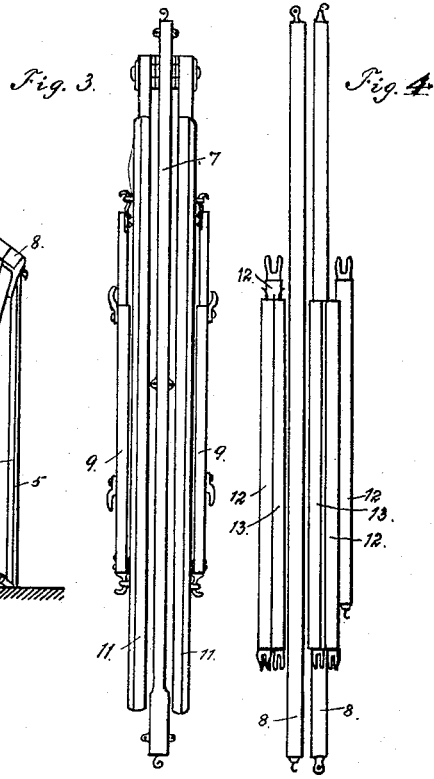
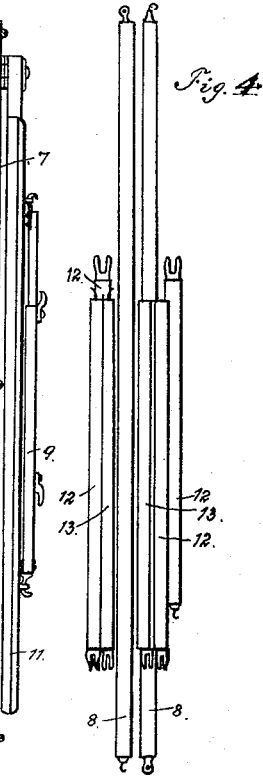
Witnesses:
Hans A. Huhn
Alex H. Siegel
Inventor
Geo. W. Zeigler
by J. Lloyd Wiegand
atty (No Model.) 2 Sheets—Sheet 2.
G. W. ZEIGLER.
TENT FRAME.
No. 407,427. Patented July 23, 1889.
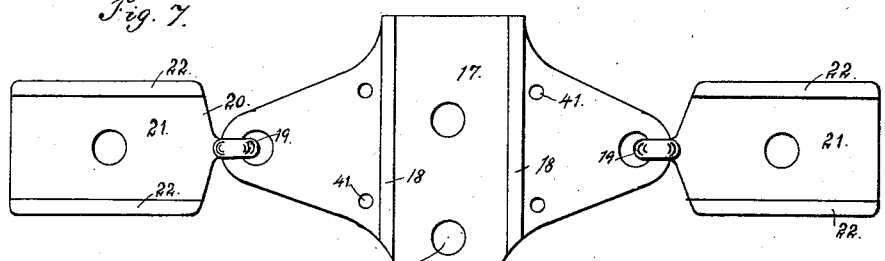
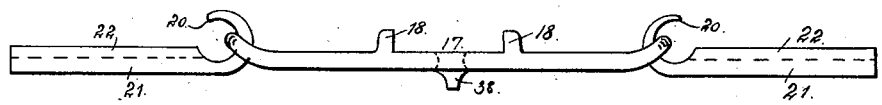
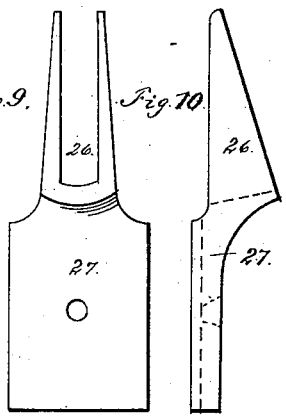
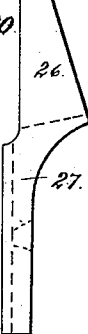
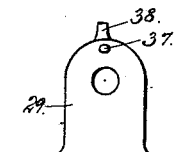
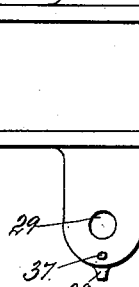
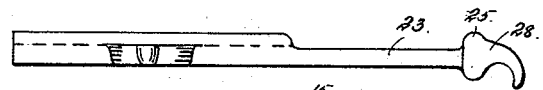
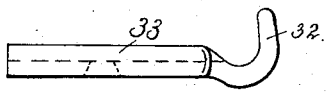
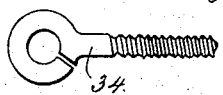
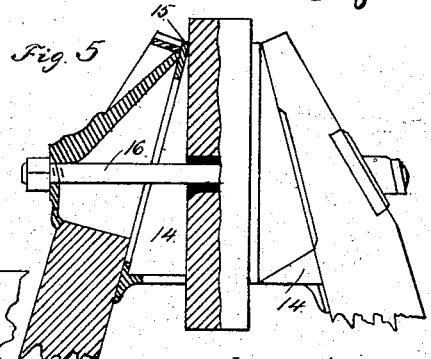
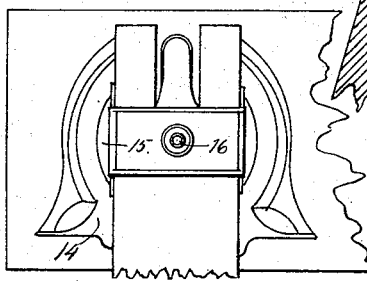
Witnesses:
Hans A. Hielm
Alex H. Siegel
Inventor
Geo. W. Zeigler
by S. Lloyd Wiegand
atty
N. PETERS, Photo-Lithographer, Washington, D. C.

UNITED STATES PATENT OFFICE.

GEORGE W. ZEIGLER, OF PHILADELPHIA, PENNSYLVANIA.

TENT-FRAME.

SPECIFICATION forming part of Letters Patent No. 407,427, dated July 23, 1889.

Application filed September 8, 1888. Renewed June 20, 1889. Serial No. 314,891. (No model.)

*To all whom it may concern:*

Be it known that I, GEORGE W. ZEIGLER, a citizen of the United States, residing at Philadelphia, in the county of Philadelphia and State of Pennsylvania, have invented certain new and useful Improvements in Wall-Tents; and I do hereby declare the following to be a sufficiently full, clear, and exact description thereof as to enable others skilled in the art to make and use the said invention.

This invention relates to wall-tents for military and other service, and has for its object the making of such structures more compact when stored, of great facility of erection, greater simplicity and lower cost of production, better stability when erected, and the saving of space usually required by the diverging cords and pins in such structures as heretofore made.

To effect these several desiderata, the nature of this invention consists in the construction, arrangement, and combination of parts hereinafter fully described and claimed, and shown in the accompanying drawings, in which—

Figure 1 shows a perspective view of a tent embodying this invention as erected, the frame and cords being shown in full lines and the canvas cover in dotted lines; Fig. 2, an end elevation thereof as erected; Figs. 3 and 4, the frame as folded for storage and transportation; Figs. 5 and 6, enlarged views of the joint for attaching the ridge-pole to the end supports; Figs. 7 and 8, respectively, enlarged top and edge views of the joints uniting the rafters to the ridge-pole; Figs. 9 and 10, respectively, enlarged front and side views of the forked plate on the upper ends of the corner-braces and central uprights; Figs. 11 and 12, respectively, top and side views of the attachment to the lower ends of the rafters to engage in the forks shown in Figs. 9 and 10; Figs. 13 and 14, respectively, front and side views of the plates attached to the lower ends of the corner-braces; and Fig. 15, the eyes into which the plates shown in Figs. 13 and 14 hook.

The same ordinals indicate the same parts in the several figures.

Referring to the drawings, Fig. 1 represents a wall-tent constructed in accordance with my invention. 1 is the front; 2, the side; 3, the roof, and 4 the door of entrance; 5, the cords for holding the tent to the stakes 6. The cords and the stakes may be outside or inside of the canvas.

Referring to Figs. 2, 3, and 4, 7 is the ridge-pole; 8, the eaves-strips; 9, the front rafters; 10, the middle rafters; 11, the central legs or main supporting-braces; 12, the corner eaves-supporting braces, and 13 the central supporting-braces. The ridge-pole 7 is secured to the end supports 11 by metallic plates 14. (Shown in Fig. 5.) These plates 14 have a perpendicular side applied to the side of the ridge-pole 7 and an outer inclined side against which the inner sides of the legs 11 either fit directly or with the intervention of a plate or washer 15. A bolt or rivet 16 passing through the supports 11, washers 15, plates 14, and ridge-pole 7 serves to clamp them together, so that the supports 11, when erected, assume the position of the legs of a trestle, and when folded to hold them in parallel position to the ridge-pole 7. This device for attaching the legs 11 to the ridge-pole 7 is the subject of a distinct application for Letters Patent, and, although forming a part of combinations hereinafter claimed, is of itself useful in other applications in the arts, and therefore not claimed herein.

The rafters 9 and 10 are secured to the ridge-pole 7 by a joint (shown in enlarged view in Fig. 6) consisting of a flat plate 17, fitting on and secured by screw-bolts to the under side of the ridge-pole 7, and provided with flanges 18, which embrace the sides of the ridge-pole. Upon each side of the plate 17 are formed eyes 19, for the reception of hooks 20, formed on plates 21, attached by screws to the upper ends of the rafters 9 and 10. The plates 21 are provided with flanges 22, which, fitting closely to the sides of the rafters, strengthen them at that point. Hooks 38 and eyes 39 on the ends of the plates 17 serve to connect contiguous tents in series, adapting them to commissary and hospital use. Eyes 41 at the ends of the plates 17 serve to attach diagonal braces 35 by means of hooked plates 31, such as shown in Figs. 13 and 14, connecting the central part of the ridge-pole 7 with the corners formed by the eaves-strips 8 and end rafters 9, and the ends of the ridge-pole 7 with the central rafter 10 near its attachment to the eaves-strip. These braces 35 may be made rigid of wood, or may be made flexible, as of wire or cords, as shown in Fig. 1. In the latter case they are convenient as a lashing to bind the parts of the frame together when folded.

To the under sides of the lower ends of the rafters 9 and 10 are screwed plates 24. (Shown detached in Figs. 11 and 12.) These plates 24 have at their lower end a stem 23, with a head 25, which engages in a fork 26, formed in the plates 27, screwed to each of the braces 12 and 13. A spur 28, projecting beyond the head 25, serves as a hook to fasten the canvas cover by an eyelet formed therein. Eyes 29, formed in the side of the plates 24, serve to attach the cords 5 and braces 35, and hooks 38 and eyes 37, also on the sides of the plates 24, serve to connect tents in series. The prongs of the forks 26 on the plates 27 are made tapering, so that when the eaves-strip 8 is placed against the ends of the rafters and the stem 23 and head 25 on the plate 24 and pressed downward on the fork 26 the edges of the fork-prongs 26 impinge on the eaves-strip 8 and prevent slipping endwise and force it tightly against the ends of the rafters 9 and 10, thus firmly clamping the parts together.

The prongs of the forks 26 are made perpendicular on the outer edge, and on the other edge inclined at such an angle as to fit against the inclined side of the eaves-strip.

The braces 12, to which the plate 27 is attached, are inclined and provided with a hook 32 at the lower end, (shown enlarged in Fig. 8,) by which they are attached to eyes 34 in the lower part of the legs 11. The hooks 32 are preferably made with flanged plates 33, as shown in Fig. 8, with which they are attached to the braces 12 by screws.

The central eaves-supports 13 rest upon the ground in vertical positions, and are provided with tapering forks, (shown in Figs. 9 and 10,) the inner and inclined side of which forks rests against the head eaves-strip 8 and the outer side against the head 25, pressing the central portion of the eaves-strip 8 firmly against the end of the central rafters 10. These forks differ only from those shown in Fig. 7 in having the flanges on the opposite side of the plates 27.

Cords 5 and 40, attached to eyes on the joint-plate 24 and to pins 6, driven in the ground, hold the tent down and brace it lengthwise; the cords, as used entirely inside of the canvas covering, are shown in dotted lines in Fig. 1. The cords 5, extending from the eaves-strip 8 to the pins 6 in a nearly-perpendicular direction, securely brace the tent to the ground by reason of the inclined position of the braces 12 and 13, thus permitting the tents in an encampment to be placed nearer to each other and avoiding the risk of tripping persons passing between the tents.

Hooks 36 and 38 and eyes 37 and 39 at the ends of the rafters and ridge-poles on the plates 24 and 17 afford an efficient and convenient means of attaching a number of tents together lengthwise, as well as of securing the canvas covers—a feature adapting the tents to commissary and hospital service in camps.

When packed for transportation, the ridge-pole 7, supports 11, rafters 9 and 10, and braces 12 fold parallel with each other within the length of the ridge-poles, and the eaves-strips 8 and braces 13 fold in parallel position, the cords 5 answering to lash them together with the pins 6 within the length of the eaves-strip, so that the entire tent-frame is, when packed, contained in three compact and easily-handled parts, which, when extended for erection, are easily hooked together, and when covered by the canvas are not liable to become accidentally unhooked, the whole forming a convenient, light, and compact tent well adapted to military service.

Having described this invention, what I claim is—

1. A frame for wall-tents, consisting of a ridge-pole 7, having at the ends diverging legs 11, pivotally attached thereto, and inclined rafters 9, secured at the lower ends to eaves-strips 8, supported and braced by an inclined rod 12, supporting the eaves-strip 8 from the lower portion of the leg, substantially as shown and set forth.

2. A frame for wall-tents, having parallel eaves-strip 8, connected by end rafters 9 and 10 and intermediate rafters 10 to a ridge-pole 7, supported by diverging legs 11 and inclined supports 12, extending from the ends of the eaves-strips 8 to the lower portion of the legs 11, and by an intermediate support 13, reaching from the central rafter 10 to the ground, combined with vertical cords 5 and pin 6, adapted to be inserted in the earth, substantially as set forth.

3. A frame for wall-tents, consisting of a ridge-pole 7, supported by divergent folding legs 11 and connected by inclined rafters 9 and 10 with horizontal eaves-strips 8, supported by diagonal braces 12 and braced and held downward by cords 5 and 40, secured to pins 6, substantially as set forth.

4. In combination with a wall-tent frame consisting of a ridge-pole 7, supported by folding legs 11 and united to horizontal eaves-strips 8 by inclined rafters 9 and 10, supported at the lower ends by braces 12, the diagonal braces 35, extending obliquely from the intersection of one rafter with the ridge-pole to the intersection of another rafter with the eaves-strip, substantially as and for the purpose set forth.

5. In a frame for wall-tents, the plate 17, having flanges 18, embracing the ridge-pole 7, and eyes 19, holding the hooks 20 upon plates 21, secured to the rafters 9, substantially as set forth.

6. In a frame for wall-tents, the plate 17, having flanges 18, embracing the ridge-pole 7, eyes 19, holding the hooks 20 upon plates 21, secured to the rafters 9, and eyes 30, arranged to hold the ends of the braces 35, substantially as set forth.

7. In a frame for a wall-tent, the plate 17, provided with flanges 18, embracing the ridge-pole 7, eyes 19, holding the hooks 20 on plates 21, attached to the rafters 9 and 10, and hooks 38 and eyes 39, arranged to fit and engage in similar hooks and eyes upon similar plates upon the ridge-poles of similar contiguous tents, substantially as set forth and described.

8. In a frame for wall-tents, the described plate 17, provided with eyes 19, 41, and 39, respectively fitting hooks 20, braces 35, and the hook 38 upon adjacent similar plates for uniting tents, substantially as set forth.

9. In a frame for wall-tents, the plate 24, fitted to the lower ends, rafters 9 and 10, provided with a stem 23, having a head 25, fitting in a fork 26, for the purpose of clamping the eaves-strips 8 to the rafters 9 and 10, and having a spur 28, constructed and arranged to hold in a canvas cover, substantially as set forth and described.

10. In a wall-tent frame, the plates 24, attached to the rafters 9 and 10, provided with stems 23, reaching across the eaves-strips 8 and through the forks 26, and having heads 25, arranged to clamp the eaves-strip 8 between the ends of the rafters 9 and 10 and the forks 26, and having eyes 29 for the attachment of the cords 5, and braces 35, substantially as shown and described.

11. In a wall-tent frame, the described plates 24, for attaching the rafters 9 and 10, eaves-strips 8, and braces 12 and 13, provided with eyes 37 and hooks 38, adapted to fit in and on similar hooks and eyes on similar plates on contiguous tent-frames, for the purpose of uniting the covers of tent-frames in a continuous series, substantially as set forth.

12. The combination of the ridge-pole 7, flexibly connected to the rafters 9 and 10 by the plates 17 and 21, attached thereto with the eaves-strips 8, and braces 12 and 13, detachably connected by the plates 24, and fork-plates 27, and the whole braced diagonally by the braces 35, substantially as shown and described.

13. The plates 27, attached to the braces 12 and 13, having tapering forks 26, in combination with the plates 24, attached to the rafters 9 and 10, having stems 23, and heads 25, for clamping the eaves-strips 8, substantially as set forth and shown.

GEORGE W. ZEIGLER.

Witnesses:
 ALEX. H. SIEGEL,
 JAMES P. PETIT.